United States Patent [19]

Tateishi et al.

[11] Patent Number: 4,920,276
[45] Date of Patent: Apr. 24, 1990

[54] HEAT-AND-ELECTRICITY SUPPLY SYSTEM

[75] Inventors: Akitaka Tateishi, Katsuta; Tadao Arakawa, Hitachi; Masaru Kurosawa, Nakaminato; Yoshifumi Kubo, Hitachi; Yoji Nagai, Tokyo, all of Japan

[73] Assignee: Hitachi, Ltd., Tokyo, Japan

[21] Appl. No.: 228,023

[22] Filed: Aug. 4, 1988

[30] Foreign Application Priority Data

Aug. 12, 1987 [JP] Japan .................................. 62-199797

[51] Int. Cl.⁵ .............................................. F01K 17/04
[52] U.S. Cl. ........................................ 290/2; 237/121
[58] Field of Search .................... 290/2; 60/39.02, 597; 237/12.1

[56] References Cited

U.S. PATENT DOCUMENTS

| | | | |
|---|---|---|---|
| 3,216,199 | 11/1965 | Shaw et al. | 290/2 X |
| 3,219,831 | 11/1965 | Ray et al. | 290/2 |
| 4,010,378 | 3/1977 | Tharpe et al. | 290/2 |
| 4,093,868 | 6/1978 | Manning | 290/2 |
| 4,329,847 | 5/1982 | Raström | 237/12.1 X |

Primary Examiner—Philip H. Leung
Assistant Examiner—W. E. Duncanson, Jr.
Attorney, Agent, or Firm—Antonelli, Terry & Wands

[57] ABSTRACT

A heat-and-electricity supply system in which steam from a steam generator is utilized to supply an electric output and a heat output such a system includes: a steam turbine driven by the steam generated in the steam generator; a clutch with reduction gear, connected to a shaft of the steam turbine; a power generator for providing the electric output, connected to the clutch with a reduction gear; a clutch with a speed increasing gear, connected to a shaft of the power generator as occasion demands; a compressor connected to the clutch with speed increasing gear; a heat-side load utilizing a cooling medium or a heating medium supplied from the compressor.

13 Claims, 3 Drawing Sheets

FIG. 3

| EQUIPMENT CASE | | 9 | 3 | 5 | 37 | 7 |
|---|---|---|---|---|---|---|
| a | WINTER | 24 MW | 4.7 MW | 4.7 MW | 5.3 MW (MAX) | 0 |
| b | SPRING · AUTUMN | 24 MW | 9 MW | 8 MW | 1 MW | 1 MW |
| c | SUMMER | 24 MW | 9 MW | 4 MW | 1 MW | 5 MW (MAX) |
| d | C/C OPERATION | 24 MW | 10 MW | 10 MW | 0 MW | 0 MW |
| e | STOP | 24 MW | STOP | MOTOR -5 MW | 10 MW | 5 MW |
| f | STOP | STOP | 0 MW | MOTOR -5 MW | 0 MW | 5 MW |

∗1. OUTPUT OF STEAM TURBINE (3) + OUTPUT OF HEAT LOAD (37) = 10 MW --- EXCEPT CASE f

∗2. OUTPUT OF GENERATOR (5) + OUTPUT OF COMPRESSOR (7) = OUTPUT OF STEAM TURBINE (3)

HEAT-AND-ELECTRICITY SUPPLY SYSTEM

BACKGROUND OF THE INVENTION

The present invention relates to a heat-and-electricity supply system for supplying a heat output and an electric output and, more particularly, to a heat-and-electricity supply system in which it is taken into consideration that seasonal fluctuations of the heat output supplied to heat-side equipment are remarkably large.

A heat-and-electricity supply system is known from, for example, Japanese Unexamined Patent Application No. 61-87908, in which a power generator is driven by a gas turbine to generate electric power, thereby providing electric outputs, and in which exhaust gas from the gas turbine is supplied to a waste-heat recovery boiler to generate steam. The steam is supplied to heat-side equipment, thereby providing a heat output. The heat-side equipment is composed of a steam turbine into which steam is introduced to drive a compressor, refrigeration equipment including a compressor as a part of a heat cycle, a heat pump operated with hot water, and the like.

In case of the above known system, the steam generated at the waste-heat recovery boiler is supplied to the heat-side equipment and is utilized as a heat output. However, the load of the heat-side equipment changes greatly with every season, and thus the heat side equipment cannot be used efficiently. For example, when the heat-side equipment is refrigeration equipment and the capacity of the waste-heat recovery boiler is designed according to a high load in the summer season, in the winter season surplus steam occurs due to low load, resulting in a decrease in efficiency. On the other hand, if an amount of fuel fed to the gas turbine is regulated, for the purpose of improving the efficiency in accordance with the load of the seasonal fluctuations in the heat-side equipment, this results in a reduction in the output of the power generator. Moreover, if almost all of the steam is supplied to the heat-side load and consequently the amount of steam introduced into the steam turbine is reduced in the summer season, erosion due to moisture occurs on the discharge side of the steam turbine, so that there is a danger of damage of the steam turbine and the turbine blades.

SUMMARY OF THE INVENTION

Therefore, an object of this invention is to provide a heat-and-electricity supply system in which countermeasures are taken for seasonal fluctuations in the load of the heat-side equipment.

According to the present invention, steam from a steam generator is supplied to a steam turbine, the steam turbine driving a power generator and a compressor which operates as a part of a heat cycle.

The output from the steam generator is distributed to an electric output of the power generator and to a heat output of the compressor. Thus, when the output of the compressor fluctuates, or for example, increases, the output of the power generator decreases correspondingly, so that the output of the steam generator is used at maximum efficiency.

BRIEF DESCRIPTION OF THE DRAWINGS

FIG. 3 is a table showing outputs of the various devices in the system illustrated in FIG. 1, in typical case of the every season and every operational mode;

DETAILED DESCRIPTION OF THE PREFERRED EMBODIMENTS

Figures 1, 2:
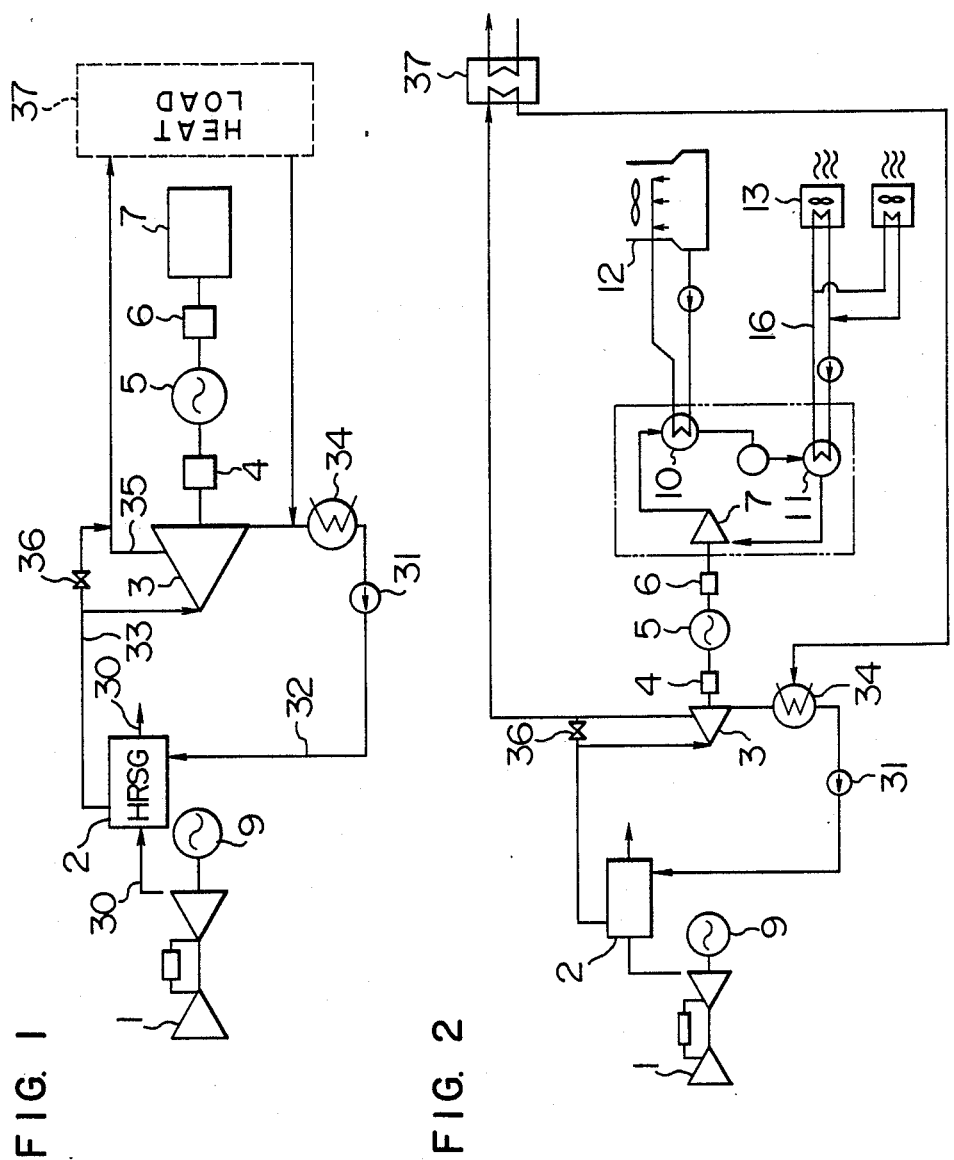
FIG. 1 is a system diagram of an embodiment of the heat-and-electricity supply system according to the present invention.
FIG. 2 is a system diagram of the system illustrated in FIG. 1, showing an arrangement of various devices driven by a compressor.

An embodiment of the present invention will be described with reference to FIG. 1. The system comprises a gas turbine 1 and a power generator 9 mounted on a common axis with the gas turbine 1. The power generator 9 is driven by the gas turbine 1 to generate an electric output. Since exhaust gas 30 from the gas turbine 1 has both a high temperature and high pressure, the exhaust gas 30 is introduced into a waste-heat recovery boiler 2 serving as a steam generator. The steam generator heats feed-water 32 supplied from a feed pump 31 to generate steam 33. The steam 33 is supplied to a steam turbine 3. After working at the steam turbine 3, the steam 33 is condensed to the feed-water 32 by a condenser 34, and the feed-water 32 is again supplied to the waste-heat recovery boiler 2. Moreover, as occasion demands, extracted steam 35 from the steam turbine 3 or the steam 33 passing through a steam supply valve 36 is supplied to a heat load 37 for heating or for other purposes.

In a well-known combined plant shown in FIG. 1, this invention is characterized in that the steam turbine 3 drives a power generator 5 and a compressor 7. These devices 3, 5 and 7 may be directly connected on a common axis. Since, however, these devices 3, 5 and 7 have respective optimum rated speeds different from each other, the power generator 5 is connected to the steam turbine 3 through a clutch means 4 fitted with reduction gear, while their compressor 7 is connected to the power generator 5 through a clutch means 6 fitted with speed-increasing gear. In such arrangement, the rotational speed from the turbine 3 whose rated speed is generally 7000 rpm is reduced to 3000 rpm or 3600 rpm to drive the power generator 5, and the rotational speed is again increased to 3600 rpm to drive the compressor 7. The compressor 7 is a part of a refrigerating equipment or a heat pump (the details are shown in FIG. 2) which is the heat-side equipment in the heat-and-electricity supply system. The compressor 7 works as a prime mover for supplying a cooling medium or a heating medium to the heat-side equipment.

FIG. 2 shows the heat-side equipment and the heat load 37 in more details. If the heat-side equipment is refrigeration equipment, the arrangement of the heat-and-electricity supply system is as follows. The compressor 7 compresses a cooling medium circulating through a condenser 10 and an evaporator 11. The cooling medium is liquefied at the condenser 10. Heat produced by liquefaction of the cooling medium is radiated by a cooling tower 12. The liquefied cooling medium is evaporated at the evaporator 11 and refrigerates water flowing in a cool water pipe 16 which cycles between the evaporator 11 and fan coil units 13. The fan coil units 13 refrigerate air with the cool water flowing in the cool water pipe 16, so that a room is air-cooled. Further, if the heat-side system is used as a heat pump, the arrangement of the system composed of the compressor 7, the condenser 10 and the evaporator 11 is common with the refrigeration equipment. In the heat pump, however, the heat generated at the condenser 10 is utilized as a heat source for heating. Moreover, a heat exchanger and not the cooling tower 12 is connected to the condenser 10, so that it is possible to obtain hot water for heating.

In the heat-and-electricity supply system above-mentioned, the maximum load of the compressor 7 is substantially equivalent to, for example, the electric load of the power generator 5 and the load of the compressor fluctuates largely with every season like the heat load 37. However, the steam turbine 3 drives the compressor 7 and the power generator 5, so that the steam generated by the waste-heat recovery boiler 2 is effectively utilized.

FIG. 3 is a table for explanation of the above fact, and shows the relation between various cases including seasons a to c and operational modes d to f, and the outputs of the power generator 9, steam turbine 3, power generator 5, heat load 37 and compressor 7, the values of the outputs being converted into electric powers equivalent. However, when the compressor 7 is used in refrigeration equipment, the load of the compressor becomes high in the summer season. In cases a to c, the gas turbine 1 is in the rated load operation, the output of the power generator 9 is 24 (MW) and the output of the waste-heat recovery boiler is 10 (MW) in electric power equivalent. The sum of the output from the steam turbine 3 and the output from the heat load 37 is 10 (MW), while the sum of the output from the power generator 5 and the output from the compressor 7 is equivalent to the output from the steam turbine 3. That is, the power generator 5 and the compressor 7 are driven by the turbine 3 so that the turbine 3 can always operate at an almost equal load with the rated load of the turbine 3 even if the load of the compressor fluctuates with every season. As a result, the turbine 3 has high efficiency. As the heat load 37 increases, the turbine 3 can not operate at the rated load. In this case, the load of the turbine 3 does not decrease to such a level that the turbine 3 may be damaged. Since the heat load 37 is provided as occasion demands, the maximum load of the heat load 37 is restricted within a proper level. According to the system of the present invention, even if the output of the compressor 7 fluctuates with every season, the steam generated at the waste-heat recovery boiler 2 can be utilized at maximum efficiency.

Explanations for various operational modes d to f will next be described. A combined cycle operation (C/C operation) indicated by d in FIG. 3, is an operational mode in which the clutch means fitted with speed increasing gear 6 is released to stop the compressor 7 and the supply of steam to the heat load 37 is stopped. In this operational mode, the output of the waste-heat recovery boiler 2 is equivalent to the output of the steam turbine 3 and is equivalent to the output of the power generator. In the case e, when the steam turbine 3 is stopped for some reason while maintaining the operation of the gas turbine 1 unchanged, the steam generated at the waste-heat recovery boiler 2 is entirely supplied to the heat load 37, so that the output of the heat load 37 becomes 10 (MW). The compressor 7 stops with stoppage of the steam turbine 3. In this case, however, when the power generator 5 is operated as a synchronous generator-motor and the clutch means fitted with reduction gear 4 is released, the compressor 7 can be driven by the synchronous generator-motor serving as a prime mover. Here, the meaning of "motor-5 (MW)" shown in FIG. 3 is that the power generator 5 serving as a motor is supplied with electric power of 5 (MW) from the electric power system. In the case f, the gas turbine 1 is also stopped under the condition of the case e. In this case, it is possible to continue the operation of the compressor 7, when the power generator 5 is used as a synchronous generator-motor in a manner described above.

Figure 4:
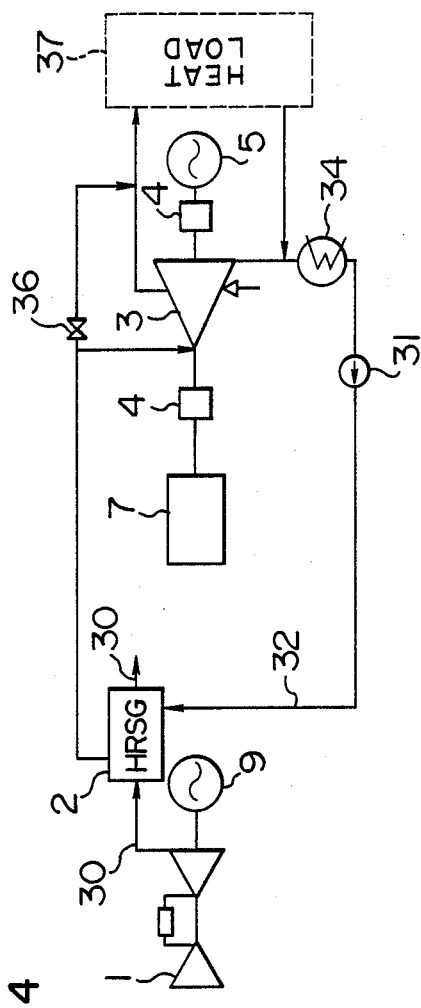
FIG. 4 is a system diagram of another embodiment of the present invention.
Figure 5:
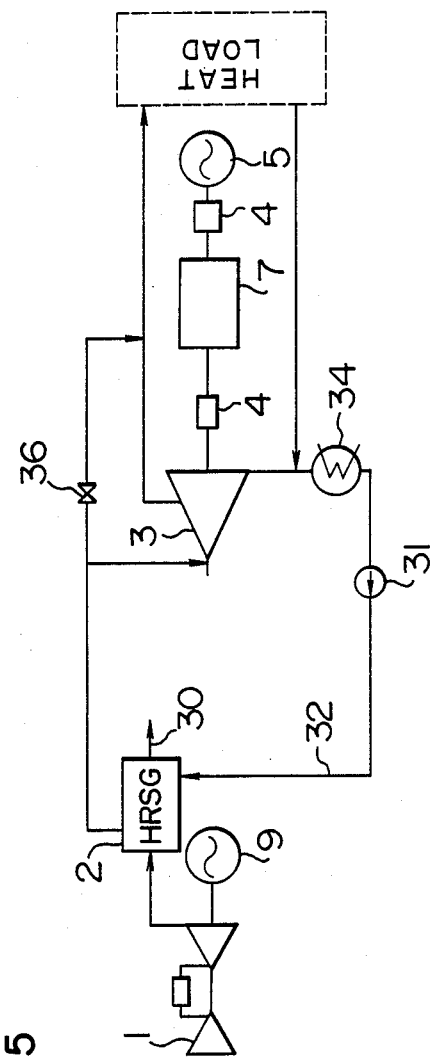
FIG. 5 is a system diagram of still another embodiment of the present invention.

FIGS. 4 and 5 show respectively other embodiments of the present invention. In these embodiments, the arrangement of the compressor 7, the steam turbine 3 and the power generator 5 is altered. Basically, the embodiments illustrated in FIGS. 4 and 5 can produce the same functional advantages as those obtained by the embodiment illustrated in FIG. 1. In case of the embodiment shown in FIG. 4, however, when the gas turbine 1 or the steam turbine 3 is stopped and the power generator 5 is utilized as a motor to drive the compressor 7, the power generator 5 drives also the steam turbine 3. Thus, the power generator 5 suffers a power-loss by the steam turbine 3. Moreover, in case of the embodiment illustrated in FIG. 5, the power generator 5 suffers a power-loss by the compressor 7 when the system is operated in the combined cycle.

The advantages of the embodiments described above are as follows:

(a) During the normal operation, the steam turbine 3 is connected to the synchronous generator 5 and the compressor 7, so that the steam turbine can operate at an almost equal load with the maximum load of the steam turbine 3 except in winter season. The output from the steam turbine 3 is distributed to the output of the synchronous generator 5 and the output of the compressor 7 in accordance with the demand ratio of electric power/heat.

(b) When the steam turbine 3 is incapable of operating due to the periodic inspection or the like and it is necessary to operate the compressor 7, the clutch means with reduction gear 4 which is arranged between the steam turbine 3 and the synchronous generator 5 is released, and the synchronous generator 5 is used as a motor, so that it is possible to drive the compressor 7.

(c) Even in case the gas turbine 1 is stopped and no steam is generated and it is necessary to drive the compressor 7, it is possible to drive the compressor 7 in a manner described in the above paragraph (b).

(d) Moreover, in case no output of the compressor is required in winter season, the clutch means with speed increasing gear 6 which is arranged between the synchronous generator-motor 5 and the compressor 7 is released, so that it possible to operate only the steam turbine 3 and the synchronous generator-motor 5.

As described above, according to the present invention, there can be provided a heat-and-electricity supply system which has high efficiency in all cases.

What is claimed is:

1. A heat-and-electricity supply system in which steam from a steam generator is utilized to supply an electric output and a heat output, said supply system comprising:

a steam turbine driven by the steam generated in said steam generator;

a power generator for providing the electric output, mechanically connected to said steam turbine; and a compressor mechanically connected to said steam turbine and utilized to provide the heat output, said compressor being utilized for supplying a cooling medium to a refrigerating equipment or for supplying a heating medium to a heating equipment wherein said steam turbine is connected to said power generator through a clutch means with reduction gear, and said power generator is connected to said compressor through a clutch means with speed increasing gear.

2. A heat-and-electricity supply system in which steam from a steam generator is utilized to supply an electric output and a heat output, said supply system comprising:
- a steam turbine driven by the steam generated in said steam generator;
- a clutch means with reduction gear, connected to a shaft of said steam turbine;
- a power generator for providing the electric output, connected to said clutch means with reduction gear;
- a clutch means with speed increasing gear, connected to a shaft of said power generator as occasion demands;
- a compressor connected to said clutch means with speed increasing gear; and
- a heat-side load utilizing a cooling medium or a heating medium supplied from said compressor.

3. A heat-and-electricity supply system according to claim 2, wherein said clutch means with speed increasing gear is released, so that the supply system operates as a combined plant.

4. A heat-and-electricity supply system according to claim 2, wherein said clutch means with reduction gear is released, and said power generator operates as a motor.

5. A heat-and-electricity supply system in which steam from a steam generator is utilized to supply an electric output and a heat output, the supply system comprising:
- a steam turbine driven by the steam generated in the steam generator, the steam turbine generating a driving turbine force;
- a power generator for supplying the electric output;
- a compressor for compressing a refrigerant to supply the heat output;
- power generator clutch means for delivering the driving turbine force to the power generator for supplying the electric output and for interrupting the driving turbine force supplied to the power generator as occasion demands so that the supply of electric output is cut off; and
- compressor clutch means for delivering the driving turbine force to the compressor for supplying the heat output and for interrupting the driving turbine force supplied to the compressor as occasion demands so that the supply of heat is cut off.

6. A heat-and-electricity supply system according to claim 5, wherein the power generator operates as a motor generating a driving motor force so that the compressor is driven by the driving motor force.

7. A heat-and-electricity supply system according to claim 5, wherein the power generator clutch means includes a power generator transmission means for changing a rotational speed transmitted from the turbine to a rotational speed suitable for the power generator.

8. A heat-and-electricity supply system according to claim 5, wherein the compressor clutch means includes a compressor transmission means for changing a rotational speed transmitted from the turbine to a rotational speed suitable for the compressor.

9. A heat-and-electricity supply system according to claim 5, wherein the power generator is connected to the turbine, and the compressor is connected to the power generator.

10. A heat-and-electricity supply system according to claim 5, wherein, the power generator is connected to the turbine, and the compressor is also connected to the turbine.

11. A heat-and-electricity supply system according to claim 5, wherein the compressor is connected to the turbine, and the power generator is connected to the compressor.

12. A heat-and-electricity supply system in which steam from a steam generator is utilized to supply an electric output and a heat output, the supply system comprising:
- a power generator for supplying the electric output;
- a compressor for compressing a refrigerant to supply the heat output;
- a steam turbine driven by the steam generated in the steam generator, the steam turbine generating a driving turbine force for the power generator and the compressor; and
- clutch means arranged between the turbine and one of the power generator and the compressor so that the clutch means connect or disconnect the turbine with the one of the power generator and the compressor, wherein the power generator and the compressor are connected and the power generator operates as a motor generating a driving motor force when the turbine is disconnected with the one of the power generator and the compressor which is connected or disconnected with the turbine by the clutch means so that the driving motor force drives the compressor without driving the turbine.

13. A heat-and-electricity supply system according to claim 12, wherein the clutch means includes a transmission means for changing a rotational speed transmitted from the turbine to a rotational speed suitable for the one of the power generator and the compressor which is connected or disconnected with the turbine through the clutch means.

* * * * *